United States Patent
Itoh et al.

[19]

[11] Patent Number: 5,878,281
[45] Date of Patent: Mar. 2, 1999

[54] SYNCHRONOUS SERIAL DATA TRANSFER DEVICE

[75] Inventors: Teruyuki Itoh; Katsunori Suzuki, both of Tokyo, Japan

[73] Assignee: Mitsubishi Denki Kabushiki Kaisha, Tokyo, Japan

[21] Appl. No.: 861,832

[22] Filed: May 23, 1997

[30] Foreign Application Priority Data

Jan. 31, 1997 [JP] Japan ................................ 9-019406

[51] Int. Cl.$^6$ ................................................ G06F 13/00
[52] U.S. Cl. ............................................ 395/881; 395/559
[58] Field of Search ........................... 395/881, 878–880, 395/849, 852–855, 200.62, 200.64, 559; 375/319

[56] References Cited

U.S. PATENT DOCUMENTS

| | | | |
|---|---|---|---|
| 4,964,141 | 10/1990 | Matsushima et al. | 375/106 |
| 4,984,190 | 1/1991 | Katori et al. | 395/200.67 |
| 5,019,966 | 5/1991 | Saito et al. | 395/849 |
| 5,412,610 | 5/1995 | Suzuki | 365/219 |
| 5,483,553 | 1/1996 | Shigetome et al. | 375/256 |
| 5,504,927 | 4/1996 | Okamoto et al. | 395/878 |
| 5,507,001 | 4/1996 | Nishizawa | 395/825 |
| 5,559,998 | 9/1996 | Suzuki et al. | 395/550 |
| 5,617,433 | 4/1997 | Suzuki | 371/48 |
| 5,721,755 | 2/1998 | Kim et al. | 375/259 |
| 5,724,615 | 3/1998 | Ishii | 395/881 |
| 5,737,522 | 4/1998 | Matsumoto | 395/185.02 |
| 5,737,633 | 4/1998 | Suzuki | 395/849 |
| 5,793,823 | 8/1998 | Nishio et al. | 375/372 |
| 5,798,969 | 8/1998 | Yoo et al. | 365/189.05 |

FOREIGN PATENT DOCUMENTS

| | | |
|---|---|---|
| 60-224333 | 11/1985 | Japan . |
| 63-257860 | 10/1988 | Japan . |
| 4323757 | 11/1992 | Japan . |
| 5181796 | 7/1993 | Japan . |

*Primary Examiner*—Christopher B. Shin
*Attorney, Agent, or Firm*—Leydig, Voit & Mayer

[57] ABSTRACT

A synchronous serial data transfer device provides a data control mechanism that sets the level of a data output terminal to a state corresponding to a state data item stored in a serial data state storing mechanism in advance. A clock control mechanism sets the level of a clock output terminal to a clock disable state corresponding to a state data item stored in a clock state storing means in advance.

19 Claims, 8 Drawing Sheets

SYNCHRONOUS SERIAL DATA TRANSFER DEVICE

BACKGROUND OF THE INVENTION

1. Field of the Invention

The present invention relates to a synchronous serial data transfer device, to which a plurality of external receiving circuits are connected, for transferring data items serially to each of the plurality of external receiving circuits in synchronization with a clock signal, and, more particularly, to an interface of data input/output terminals or clock input/output terminals for connecting the synchronous serial data transfer device to the external receiving circuits after the final data item has been transferred.

2. Description of the Prior Art

FIG. 12 is a block diagram showing a conventional synchronous serial data communication system and FIG. 13 is a block diagram showing the internal configuration of a conventional synchronous data transfer device shown in FIG. 12. In FIGS. 12 and 13, the reference number 1 designates the conventional synchronous data transfer device for transferring data items serially in synchronization with a clock signal, 2a to 2n denote a plurality of external receiving circuits for receiving transfer data items transferred from the conventional synchronous data transfer device 1. The reference number 11 indicates a data output terminal through which data items are transferred from the conventional synchronous serial data transfer device 1 to the external receiving circuits 2a to 2n. The reference number 12 denotes a clock output terminal through which a clock signal is transferred from the conventional serial data transfer device 1 to the external receiving circuits 2a to 2n. The reference number 13 designates a data input terminal through which each of the external receiving circuits 2a to 2n receives data transferred through the data output terminal 11 of the conventional synchronous serial data transfer device 1. The reference number 14 indicates a clock input terminal through which each of the external receiving circuits 2a to 2n receives the clock signal provided from the synchronous serial data transfer device 1.

Further, the reference number 21 designates a clock signal generation means for generating the clock signal which will be transferred to the external receiving circuits 2a to 2n through the clock output terminal 12. The reference number 22 indicates a serial data output means for receiving input data items in parallel from external devices (not shown), then for converting the input data items to serial data items, and for transferring the converted serial data items as transfer data items to the external receiving circuits 2a to 2n through the data output terminal 11 in synchronization with the clock signal supplied by the clock signal generation means 21.

Next, the operation of the conventional synchronous serial data transfer device 1 will be explained.

When receiving input data items transferred from the external devices (not shown) in parallel, the synchronous serial data transfer device 1 converts these input data items into serial data items by using the serial data output means 22. Then, the synchronous serial data transfer device 1 generates transfer data items according to the converted serial data items in synchronization with the clock signal generated by the clock signal generation means 21. The synchronous serial data transfer device 1 transfers the transfer data items through the data output terminals and also transfers the clock signal through the clock output terminal 12 to the external receiving circuits 2a to 2n, that are selected by the device 1, in synchronization with the clock signal generated by the clock signal generation means 21.

When the serial data transfer operation is completed, the data output terminal 11 in the synchronous serial data transfer device 1 holds the level of the last data item in the transfer data items, as shown in FIG. 14. Accordingly, since the conventional synchronous serial data transfer device 1 has the configuration described above, when the data level of an invalid data item in one of the external receiving circuits 2a to 2n is a high level (hereinafter, referred to as "H level"), it is necessary to set the level of the final data item to the H level so that the level of the output terminal 11 has the H level. Or, it is required to communicate the completion of the data transfer operation from the synchronous serial data transfer device 1 to the external receiving circuits 2a to 2n in a predetermined manner. Additionally, the electrical the connection between the synchronous serial data transfer device 1 and the external receiving circuits 2a to 2n through the data output terminal 11 and the data input terminal 13 must be broken.

Furthermore, when the external receiving circuits 2a to 2n have different levels of the invalid data items, it is necessary to change the hardware configuration of the conventional synchronous serial data transfer device 1 in order to match or to fit the external receiving circuits 2a to 2n having different levels of the invalid data items.

On the other hand, the voltage level of the clock output terminal 12 is 1 (for example, the H level) when the final data transfer operation is completed and when the clock signal is a falling enable. Further, the voltage level of the clock output terminal 12 is 0 (for example, the L level) when the final data transfer operation is completed and when the clock signal is a rising enable. Therefore, it is necessary to change the hardware configuration of the conventional synchronous serial data transfer device 1 connecting to the external receiving circuits having different clock enable edges.

The following reference is a technical example of the conventional synchronous serial data transfer device:

Japanese Laid-open Publication Number: JP-A-5/181796.

As described above in detail, because the conventional synchronous serial data transfer device 1 has the above configuration, it must be required to match or to fit the level of a final data item to be transferred to the external receiving devices according to the input receiving data invalid level of each of the external receiving circuits 2a to 2n, or it is necessary to communicate the completion of the data transfer operation to the external receiving circuits 2a to 2n in a predetermined manner so that the external receiving circuits 2a to 2n can electrically break the data transfer connections between the synchronous serial data transfer device 1 and the external receiving circuits 2a to 2n. Therefore it is necessary to change the hardware configuration of the synchronous serial data transfer device 1 when the device 1 is connected to the external receiving circuits 2a to 2n having different input receiving data invalid levels of the input data items, or when the device 1 is connected to the external receiving circuits 2a to 2n having different clock enable edges.

SUMMARY OF THE INVENTION

Accordingly, an object of the present invention is, with due consideration to the drawbacks of the conventional synchronous serial data transfer device, to provide a synchronous serial data transfer device which is capable of matching or fitting external receiving circuits having different input receiving data invalid levels or different clock enable edges without changing the hardware configuration of the synchronous serial data transfer device.

In accordance with a preferred embodiment of the present invention, a synchronous serial data transfer device comprises serial data output control means for serially outputting transfer data items to external receiving circuits through a data output terminal in synchronization with a clock signal generated by clock signal generation means and for generating a transfer completion signal when transfer operation of a final data item in the transfer data items being completed, serial data state storing means for storing a level of the data output terminal to be set after the serial data output control means generates the transfer completion signal as a state data item, and data control means for receiving the transfer data items serially transferred from the serial data output control means in synchronization with the clock signal, for outputting the transfer data items as transmission data to the data output terminal, and for setting the level of the data output terminal to a predetermined level corresponding to the state data item stored in the serial data state storing means when the data control means receives the transfer completion signal generated by the serial data output control means.

In this embodiment of the synchronous serial data transfer device described above, the serial data state storing means stores the state data item for setting and keeping the level of the data output terminal to a low level data item "0" after the serial data output control means generates the transfer completion signal.

In this embodiment of the synchronous serial data transfer device described above, the serial data state storing means stores the state data item for setting and keeping the level of the data output terminal to a high level data item "1" after the serial data output control means generates the transfer completion signal.

In this embodiment of the synchronous serial data transfer device described above, the serial data state storing means stores the state data item for setting and keeping the level of the data output terminal to a high impedance state after the serial data output control means generates the transfer completion signal.

In this embodiment of the synchronous serial data transfer device described above, the serial data state storing means comprises a state register.

In this embodiment of the synchronous serial data transfer device described above, the data control means comprises a selector.

In accordance with another preferred embodiment of the present invention, a synchronous serial data transfer device comprises serial data output control means for serially outputting transfer data items to external receiving circuits through a data output terminal in synchronization with a clock signal generated by clock signal generation means and for generating a transfer completion signal when transfer operation of a final data item in the transfer data items being completed, clock state storing means for storing a level of the clock output terminal to be set after the serial data output control means generates the transfer completion signal as a state data item, and clock control means for receiving the clock signal transferred from the clock signal generation means, and for setting the level of the clock output terminal to a predetermined level corresponding to the state data item stored in the clock state storing means when the clock control means receives the transfer completion signal generated by the serial data output control means.

In this embodiment of the synchronous serial data transfer device described above, the clock state storing means stores the state data item for setting and keeping the level of the clock output terminal to a low level data item "0" after the serial data output control means generates the transfer completion signal.

In this embodiment of the synchronous serial data transfer device described above, the clock data state storing means stores the state data item for setting and keeping the level of the clock output terminal to a high level data item "1" after the serial data output control means generates the transfer completion signal.

In this embodiment of the synchronous serial data transfer device described above, the clock state storing means stores the state data item for setting and keeping the level of the clock output terminal to a high impedance state after the serial data output control means generates the transfer completion signal.

In this embodiment of the synchronous serial data transfer device described above, the clock state storing means comprises a state register.

In this embodiment of the synchronous serial data transfer device described above, the clock control means comprises a selector.

In accordance with another preferred embodiment of the present invention, a synchronous serial data transfer device comprises serial data output control means for serially outputting transfer data items to external receiving circuits through a data output terminal in synchronization with a clock signal generated by clock signal generation means and for generating a transfer completion signal when transfer operation of a final data item in the transfer data items being completed, serial data state storing means for storing a level of the data output terminal to be set after the serial data output control means generates the transfer completion signal as a state data item, data control means for receiving the transfer data items serially transferred from the serial data output control means in synchronization with the clock signal, for outputting the transfer data items as transmission data to the data output terminal, and for setting the level of the data output terminal to a predetermined level corresponding to the state data item stored in the serial data state storing means when the data control means receives the transfer completion signal generated by the serial data output control means, clock state storing means for storing a level of the clock output terminal to be set after the serial data output control means generates the transfer completion signal as a state data item, and clock control means for receiving the clock signal transferred from the clock signal generation means, and for setting the level of the clock output terminal to a predetermined level corresponding to the state data item stored in the clock state storing means when the clock control means receives the transfer completion signal generated by the serial data output control means.

BRIEF DESCRIPTION OF THE DRAWINGS

These and other objects, features, aspects and advantages of the present invention will become more apparent from the following detailed description of the present invention when taken in conjunction with the accompanying drawings, in which.

DESCRIPTION OF THE PREFERRED EMBODIMENTS

Other features of this invention will become apparent through the following description of preferred embodiments which are given for illustration of the invention and are not intended to be limiting thereof.

Preferred embodiments of the synchronous serial data transfer device according to the present invention will now be described with reference to the drawings.

Figure 1:
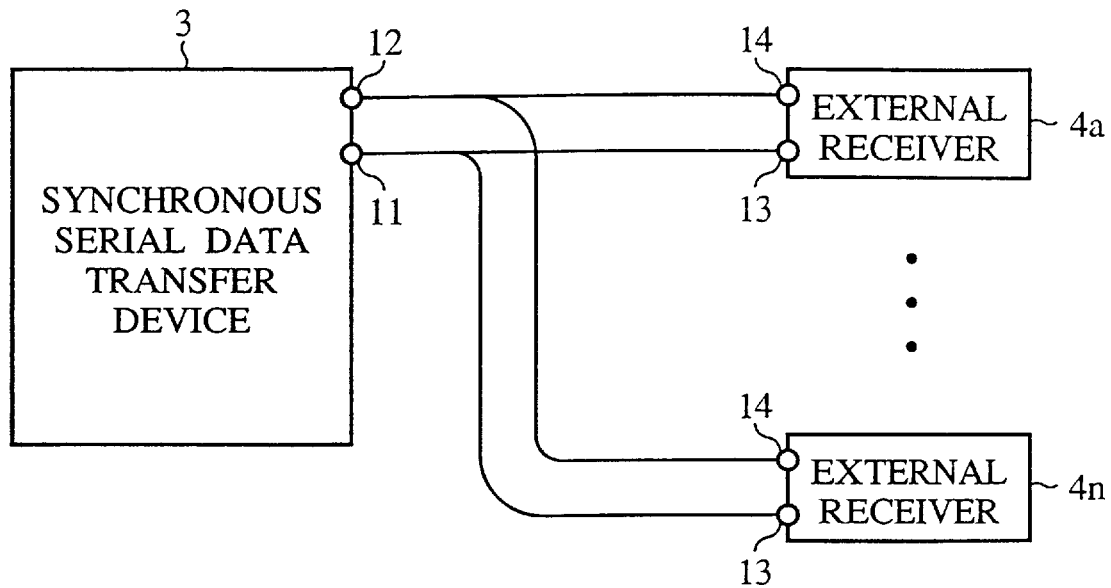
FIG. 1 is a block diagram showing a data communication system using the synchronous serial data transfer device according to a first embodiment of the present invention.

FIG. 1 is a block diagram showing a data communication system using the synchronous serial data transfer device according to a first embodiment of the present invention.

Figure 2:
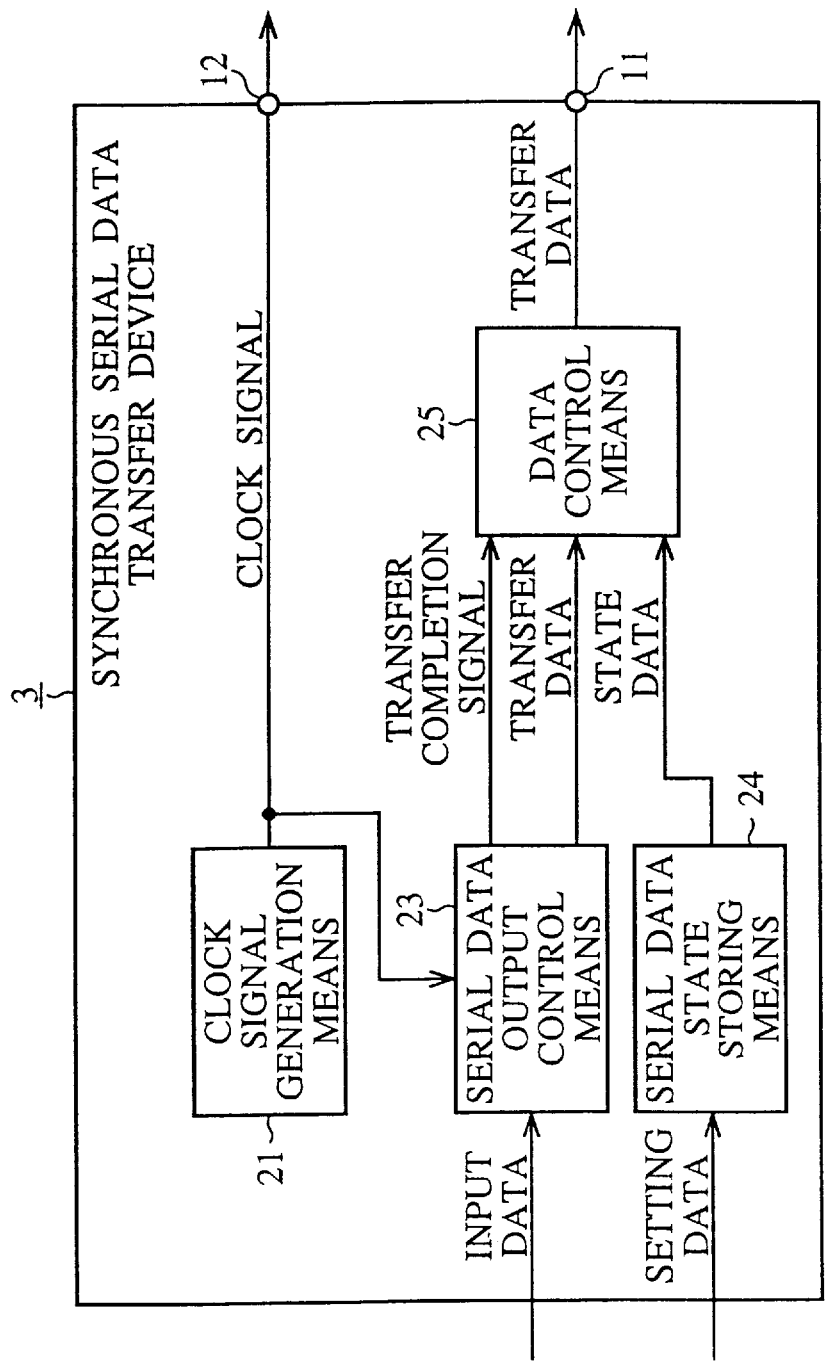
FIG. 2 is a block diagram showing the internal configuration of the synchronous serial data transfer device of the first embodiment shown in FIG. 1.

FIG. 2 is a block diagram showing the internal configuration of the synchronous serial data transfer device of the first embodiment shown in FIG. 1.

In FIGS. 1 and 2, the reference number 3 designates the synchronous serial data transfer device as the first embodiment of the present invention for transferring data items serially in synchronization with a clock signal, 4a to 4n denote a plurality of data receiving devices for receiving data items transferred from the synchronous serial data transfer device 3. The reference number 11 indicates a data output terminal through which the synchronous serial data transfer device 3 transfers data to the external receiving circuits 4a to 4n. The reference number 12 designates a clock signal output terminal through which the device 3 transfers the clock signal to the external receiving circuits 4a to 4n. The reference number 13 indicates a data input terminal through which each of the external receiving circuits 4a to 4n receive the data from the synchronous serial data transfer device 3. The reference number 14 denotes a clock input terminal through which each of the external receiving circuits 4a to 4n receives the clock signal. Further, the reference number 21 designates a clock signal generation means for generating a clock signal to be output through the clock output terminal 12 to the external receiving circuits 4a to 4n. This clock signal generation means 21 for generating the clock signal to be transferred through the clock output terminal 12 has the same configuration of the clock signal generation means 21 in the conventional synchronous serial data transfer device shown in FIG. 13.

The reference number 23 designates a serial data output control means for converting received data items, which are transferred from external devices (not shown) and received in parallel, for serially transferring converted data items as transfer data items to be transferred to the external devices 4a to 4n through the data output terminals, and for generating a transfer completion signal when the final data item is transferred to the external receiving circuits 4a to 4n.

The reference number 24 designates a serial data state storing means for setting and storing the state of a level (for example, a voltage level) of the data output terminal 11 after the serial data output control means 23 generates the transfer completion signal is generated at the completion of the final data transfer operation. For example, the serial data state storing means comprises state registers for storing state data based on the set data item. The reference number 25 designates a data control means for transferring the data items provided from the serial data output control means 23 to the data output terminal 11 in synchronization with the clock signal. Then, the data control means 25 sets the state of the data output terminal 11 to the state corresponding to the state data item stored in the serial data state storing means 24 when the serial data output control means 23 generates the transfer completion signal after the final data item is transferred. This data control means comprises a selector for switching the transfer data item to the state data item or the state data item to the transfer data item, for example.

Figure 13:
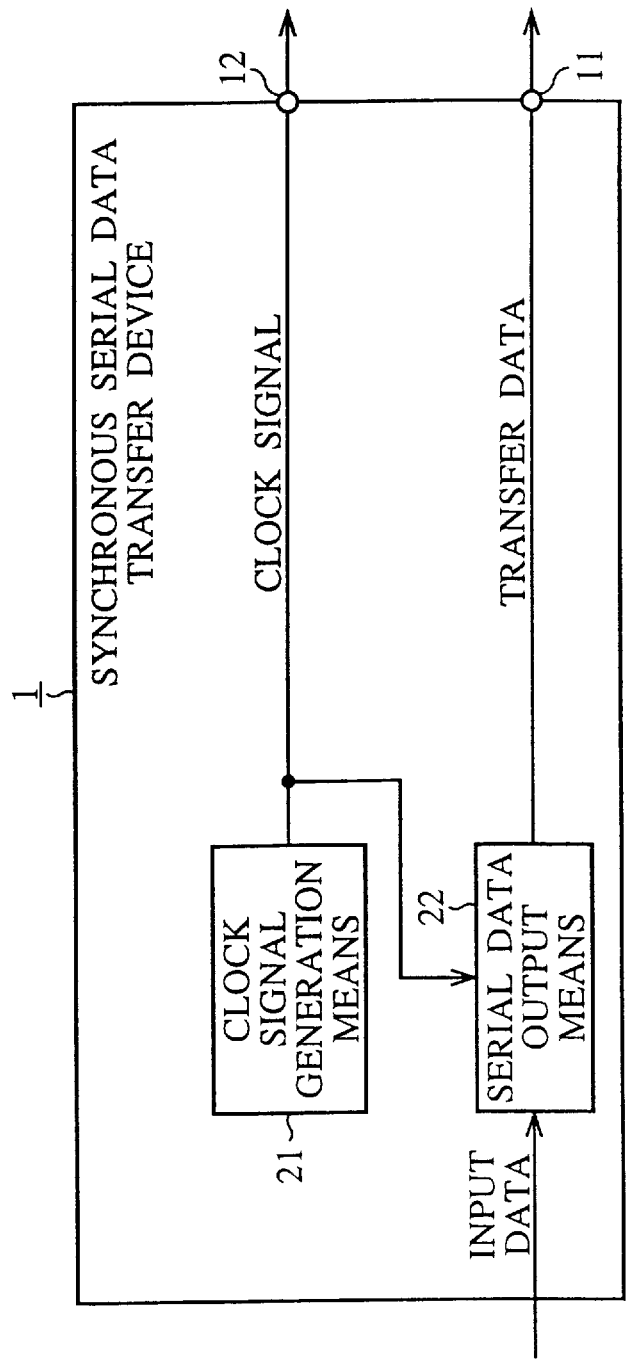
FIG. 13 is a block diagram showing the internal configuration of the conventional synchronous serial data transfer device shown in FIG. 12.

The synchronous serial data transfer device 3 of the first embodiment shown in FIG. 2 is different in configuration from the conventional synchronous serial data transfer device 1 shown in FIG. 13. That is, the synchronous serial data transfer device 3 comprises the clock signal generation means 21, the serial data output control means 23, the serial data state storing means 24 and the data control means 25.

Next, the operation of the synchronous serial data transfer device 3 of the first embodiment will be explained.

Figure 3:
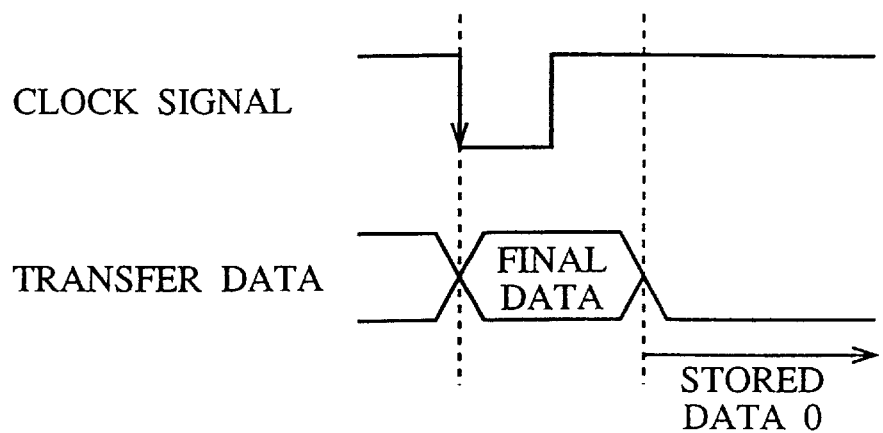
FIG. 3 is a timing chart showing waveforms of a transferred data item and a clock signal when the invalid level of input data (or the input receiving data invalid level) received by the external receiving circuit connected to the synchronous serial data transfer device of the first embodiment shown in FIG. 1 is data "0".
Figure 4:
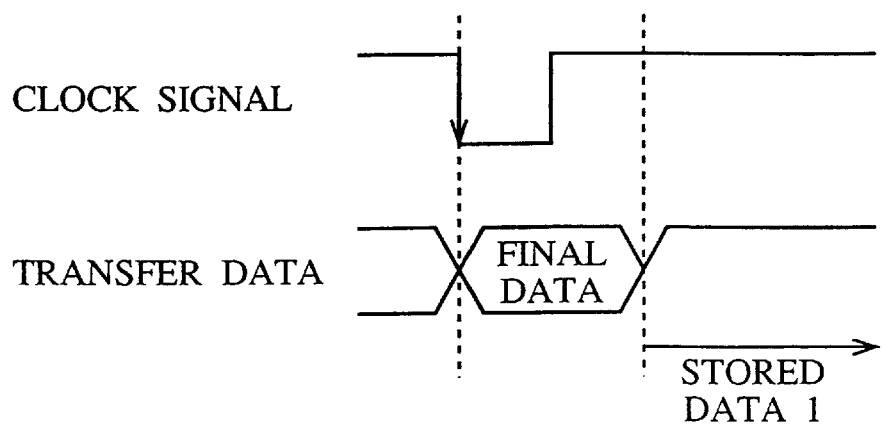
FIG. 4 is a timing chart showing waveforms of a transferred data item and a clock signal when the invalid level of input data (or the input receiving data invalid level) received by the external receiving circuit connected to the synchronous serial data transfer device of the first embodiment shown in FIG. 1 is data "1".
Figure 5:
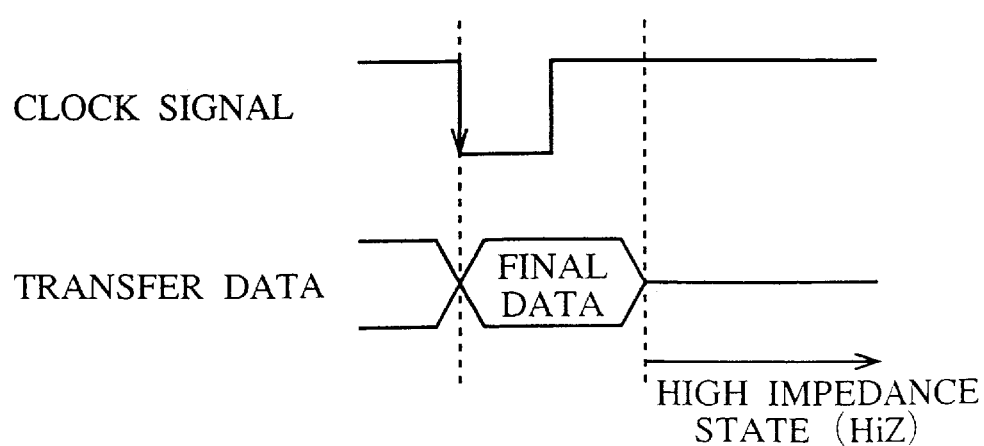
FIG. 5 is a timing chart showing waveforms of a transferred data item and a clock signal when the invalid level of input data (or the input receiving data invalid level) received by the external receiving circuit connected to the synchronous serial data transfer device of the first embodiment shown in FIG. 1 is in a high impedance state.

FIG. 3 is a timing chart showing the waveforms of a data item transferred from the data output terminal 11 and of a clock signal transferred from the clock signal output terminal 12 when the invalid level of input data (or the input receiving data invalid level) received by the external receiving circuits 4a to 4n connected to the synchronous serial data transfer device 3 of the first embodiment shown in FIG. 1 is data "0"; FIG. 4 is a timing chart showing the waveforms of a data item transferred from the data output terminal 11 and a clock signal transferred from the clock signal output terminal 12 when the invalid level of input data (or the input receiving data invalid level) received by the external receiving circuits 4a to 4n connected to the synchronous serial data transfer device 3 of the first embodiment shown in FIG. 1 is data "1"; and FIG. 5 is a timing chart showing the waveforms of a data item transferred from the data output terminal 11 and a clock signal transferred from the clock output terminal 12 when the invalid level of input data (or the input receiving data invalid level) received by the external receiving circuits 4a to 4n connected to the synchronous serial data transfer device 3 of the first embodiment shown in FIG. 1 is in a high impedance state.

When the synchronous serial data transfer device 3 of the first embodiment receives data items transferred from external devices (not shown) in parallel, the serial data output control means 23 converts the received data items to serial data items and generates transfer data items in synchronization with the clock signal generated by the clock signal generation means 21. The transfer data items are transferred to the data control means 25. The data control means 25 selects the external receiving circuits 4a to 4n and transfers the received transfer data items as transmission data items through the data output terminal 11 to the external receiving circuits 4a to 4n. In the designation of the target external receiving circuits to which the transfer data items are transferred, addresses indicating the target external receiving circuits 4a to 4n are added into the head field of transfer data fields in which the transfer data items are stored. At the same time, the clock signal generated by the clock signal generation means 21 is also transferred to the target external receiving circuits 4a to 4n.

The serial data output control means 23 generates the transfer completion signal when the final transfer data item in the converted serial transfer data items is transferred to the data control means 25 (in other words, when the operation of the serial data transfer is completed), transfers the generated transfer completion signal to the data control means 25. The data control means 25 receives the transfer completion signal, reads the state data item that has been stored in the serial data state storing means 24 and transfers the state data item to the data output terminal 11 after the operation of the data transfer is completed. Thereby, it can be possible to keep the level of the data output terminal 11 in a predetermined state corresponding to the state data item read out from serial data state storing means 24.

In this case, in particular, the setting or storing of the state data item into the serial data state storing means 24 is executed by receiving a setting data item corresponding to an input data receiving invalid level of each of the external receiving devices 4a to 4n to be connected. For example, when the input receiving data invalid level of the external receiving circuits 4a to 4n connected to the synchronous serial data transfer device 3 is zero, a data item for setting the state of the data output terminal 11 to the level of data "0" after the transmission of the final data item is completed is input to the serial data state storing means 24 in advance.

Thereby, the data control means 25 can read the state data item of the data "0" from the serial data state storing means 24. Then, the data control means 25 that has received the transfer completion signal outputs the data item "0" as the transmission data items after the transmission of the final data item is completed.

In the manner described above, after the final data item is transferred to the external receiving circuit as the data transfer target device, for example, to the external receiving circuit 4a shown in FIG. 3, the state of the data output terminal 11 becomes the input receiving data invalid level of the external receiving device, for example, the input receiving data invalid level "0" of the external receiving circuit 4n.

The same process described above can also be used when the input receiving data invalid level is the data "1" or the high impedance level. That is, when the input receiving data invalid level is the data "1", the state data item to be used for outputting data "1" is stored into the serial data state storing means 24 in advance, and then the data control means 25 transfers the data "1" stored in the serial data state storing means 24 after the completion of the final data transfer so that the level of the data output terminal 11 becomes the data "1", as shown in FIG. 4. Furthermore, when the input receiving data invalid level is the high impedance state, the state data item corresponding to the high impedance state is stored into the serial data state storing means 24 in advance, and then the data control means 25 transfers the state data item stored in the serial data state storing means 24 to the data output terminal 11 after the completion of the final data transfer so that the level of the data output terminal 11 becomes the high impedance state, as shown in FIG. 5.

Thus, according to the synchronous serial data transfer device 3 of the first embodiment, it is possible to set or keep the level of the data output terminal 11 to the input receiving data invalid level of each of the external receiving circuits 4a to 4n by rewriting the state data item stored in the serial data state storing means 24 with setting data item. That is, it is possible to match or fit the external receiving circuits 4a to 4n having different input receiving data invalid levels without any changing of the hardware configuration of the synchronous serial data transfer device 3.

Furthermore, it is also possible to store or keep a state data item for keeping a final data item in transfer data items in the serial data state storing means 24 in addition to the state data items used for setting the level of the data output terminal 11 to the data item "0", the data item "1", and the high impedance state described above. When the above data items are stored in the serial data state storing means 24, the synchronous serial data transfer device 3 of the first embodiment can be applied to conventional communication systems without any changing hardware configurations. This provides interchangeability for the synchronous serial data transfer device 3 of the first embodiment according to the present invention.

Second embodiment

In the synchronous serial data transfer device 3 of the first embodiment, the level of the data output terminal 11 is set to the state corresponding to the input receiving data invalid state of the external receiving circuit to be connected to the synchronous serial data transfer device 3. But, the present invention is not limited by the first embodiment. It is passible to set the clock output terminal 13 to a clock edge disable state of a target external receiving circuit to which data items are transferred. Thereby, the synchronous serial data transfer device of the present invention can be applied to external receiving circuits having different clock enable edges.

Figure 6:
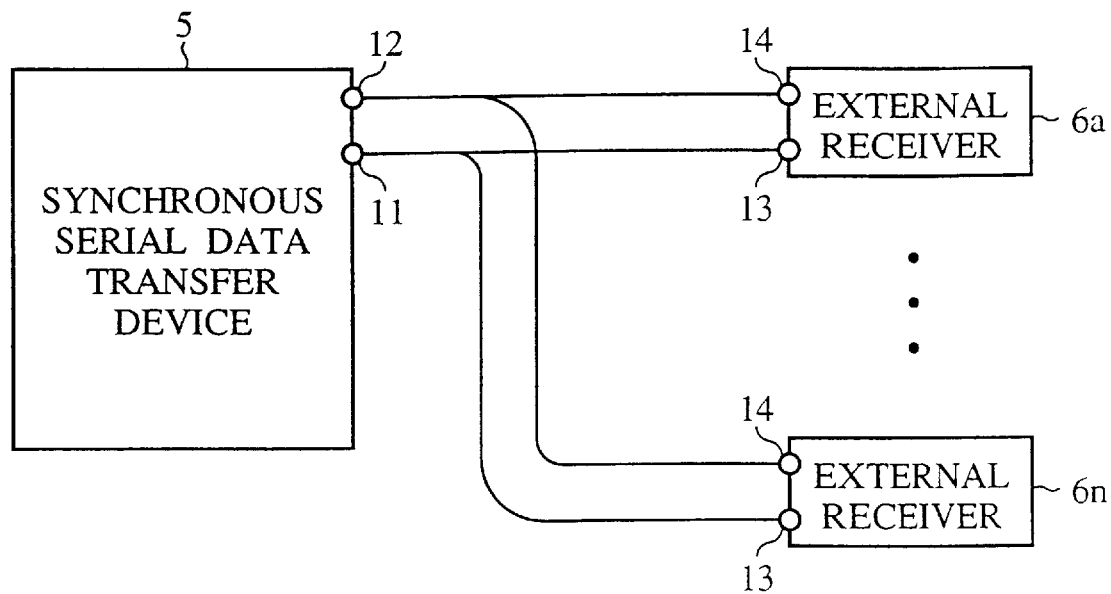
FIG. 6 is a block diagram showing a data communication system using the synchronous serial data transfer device according to a second embodiment of the present invention.

FIG. 6 is a block diagram showing a data communication system using the synchronous serial data transfer device 5 according to a second embodiment of the present invention.

Figure 7:
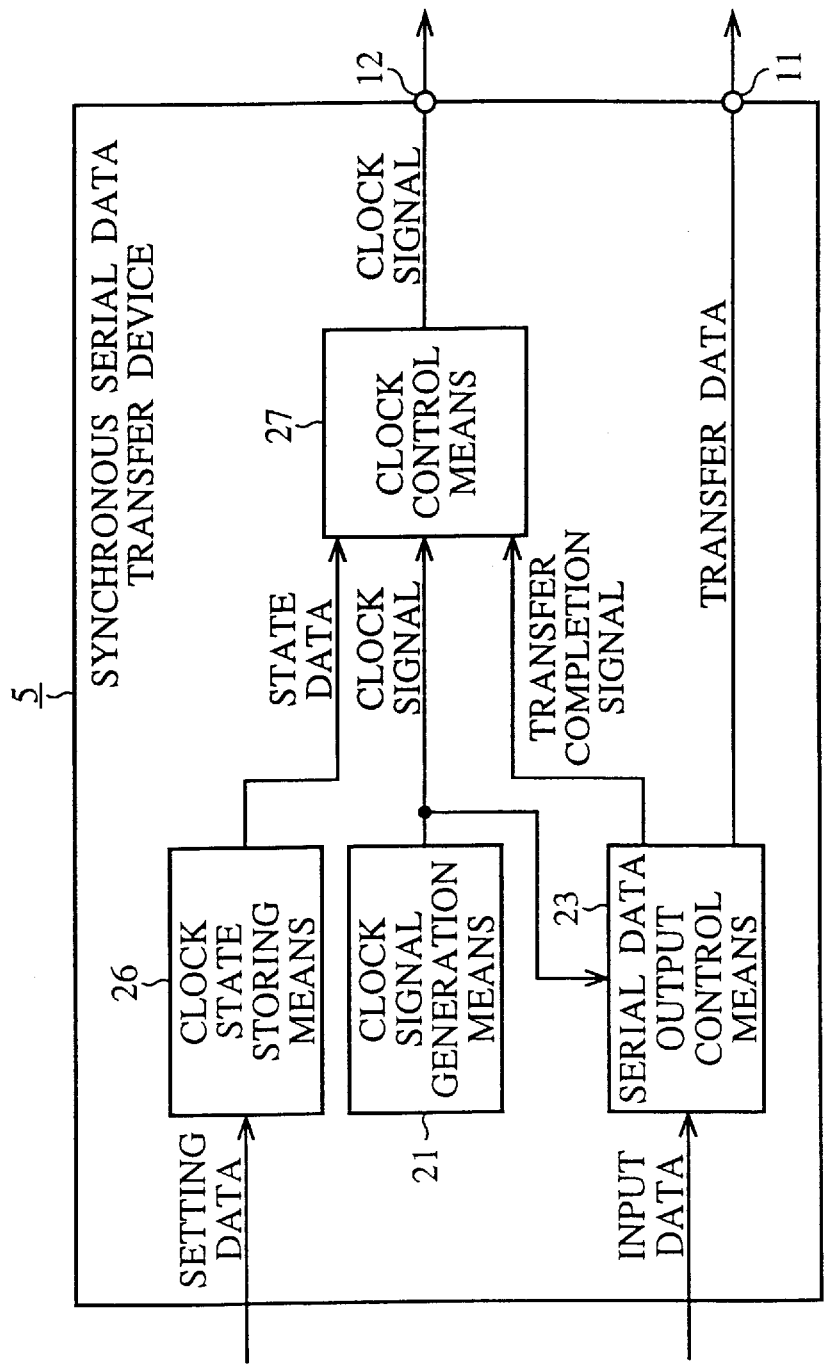
FIG. 7 is a block diagram showing the internal configuration of the synchronous serial data transfer device of the second embodiment shown in FIG. 6.

FIG. 7 is a block diagram showing the internal configuration of the synchronous serial data transfer device 5 of the second embodiment shown in FIG. 6.

In FIGS. 6 and 7, the reference number 5 designates the synchronous serial data transfer device for transferring transmission data items serially in synchronization with a clock signal as the second embodiment of the present invention. The reference numbers 6a to 6n denote a plurality of external receiving circuits for receiving the data items transferred from the synchronous serial data transfer device 5. The reference number 11 designates the data output terminal, 12 indicates the clock output terminal, 13 denotes the data input terminal, and 14 indicates the clock input terminal. The reference number 21 designates a clock signal generation means and 23 denotes a serial data output control means that are incorporated in the synchronous serial data transfer device 5. The above components are same as the components in the synchronous serial data transfer device 3 of first embodiment shown in FIGS. 1 and 2. Therefore the explanation of these components is omitted here.

The reference number 26 shown in FIG. 7 designates a clock state storing means for storing the level of the clock output terminal 12 based on a setting data item provided from an external device (not shown) after the serial data output control means 23 generates the transfer completion signal when the serial data output control means 23 has transferred the final data item in the transfer data items. The clock state storing means comprises a state register, for example.

The reference number 27 designates a clock control means for outputting the clock signal generated by the clock signal generation means 21 to the clock signal output terminal 12 and for setting the level of the clock output terminal 12 to a predetermined state corresponding to the state data item stored in the clock state storing means 26, that is, to a clock edge disable state of each of the external receiving circuits 6a to 6n connected to the synchronous serial data transfer device 5, when the serial data output control means 23 generates the transfer completion signal when the serial data output control means 23 has transferred the final data item in the transfer data items.

Specifically, the synchronous serial data transfer device 5 of the second embodiment shown in FIG. 7 is different in configuration from the synchronous serial data transfer device 3 of the first embodiment shown in FIG. 2, because the synchronous serial data transfer device 5 further comprises the clock state storing means 26 and the clock control means 27.

Next, the operation of the synchronous serial data transfer device 5 of the second embodiment will be explained.

Figure 8:
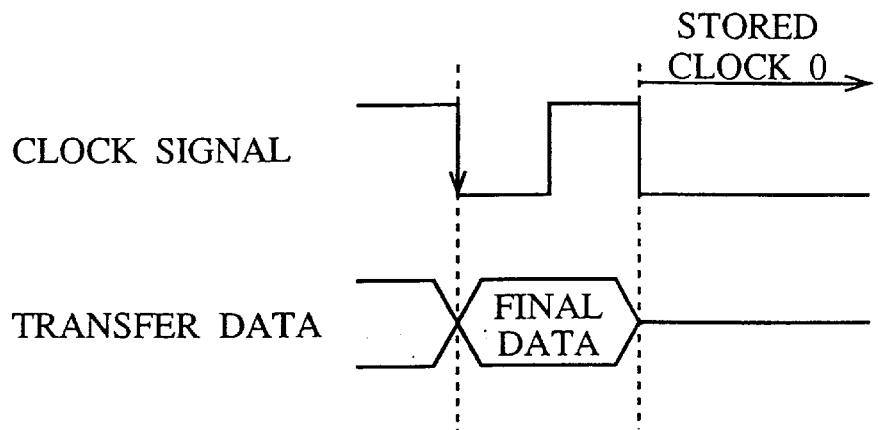
FIG. 8 is a timing chart showing waveforms of a transferred data item and a clock signal when the state of a clock enable edge in an external receiving circuit connected to the synchronous serial data transfer device of the second embodiment shown in FIG. 6 is a rising enable.
Figure 9:
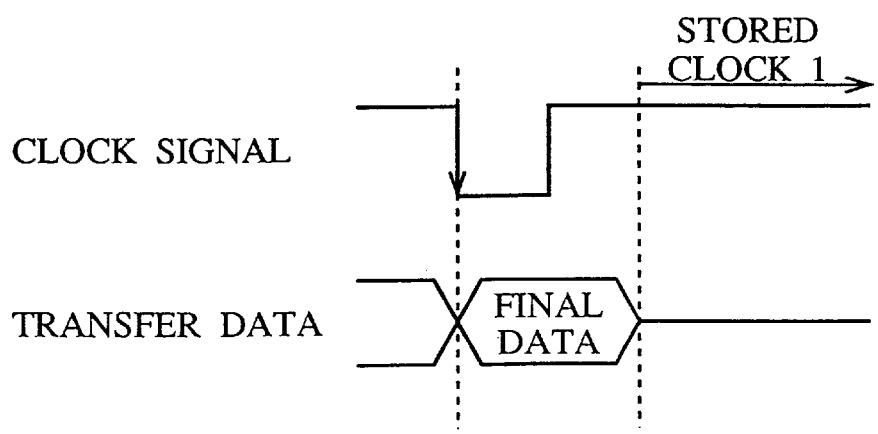
FIG. 9 is a timing chart showing waveforms of a transferred data item and a clock signal when the state of a clock enable edge in an external receiving circuit connected to the synchronous serial data transfer device of the second embodiment shown in FIG. 6 is a falling enable.
Figure 10:
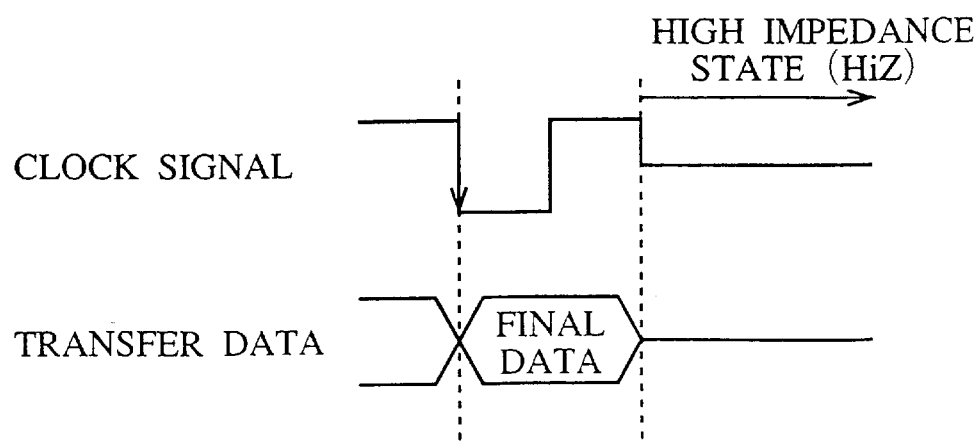
FIG. 10 is a timing chart showing waveforms of a transferred data item and a clock signal when a clock edge disable state in an external receiving circuit connected to the synchronous serial data transfer device of the second embodiment is a high impedance state.

FIG. 8 is a timing chart showing waveforms of a transferred data item and a clock signal when the state of a clock enable edge in the external receiving circuit connected to the synchronous serial data transfer device 5 of the second embodiment shown in FIG. 6 is a rising enable; FIG. 9 is a timing chart showing waveforms of a transferred data item and a clock signal when the state of a clock enable edge in the external receiving circuit connected to the synchronous serial data transfer device 5 of the second embodiment shown in FIG. 6 is a falling enable; and FIG. 10 is a timing chart showing waveforms of a transferred data item and a clock signal when a clock edge disable state in the external receiving circuit connected to the synchronous serial data transfer device 5 of the second embodiment is a high impedance state.

When the synchronous serial data transfer device 5 of the second embodiment receives data items transferred from external devices (not shown) in parallel, the serial data output control means 23 converts the received data items to serial data items and generates transfer data items in synchronization with the clock signal generated by the clock signal generation means 21. The transfer data items are transferred to the data control means 25. The data control means 25 selects the external receiving circuits 6a to 6n and transfers the received transfer data items as transmission data items through the data output terminal 11 to the external receiving circuits 6a to 6n. At the same time, the clock signal generated by the clock signal generation means 21 is also transferred to the clock control means 27. The clock control means 27 then transfers the received clock signal to the target external receiving circuits 6a to 6n.

The serial data output control means 23 generates the transfer completion signal, when the final transfer data item in the converted serial transfer data items is transferred (in other words, when the operation of the serial data transfer is completed), to the clock control means 27 and transfers the transfer completion signal to the data control means 25. The clock control means 27 receives the transfer completion signal and reads the state data item that has been stored in the clock state storing means 26 and transfers the state data item to the clock output terminal 12 after the operation of the final data item transfer is completed. Thereby, it can be possible to keep the level of the clock output terminal 12 with a predetermined clock edge disable state corresponding to the state data item read out from the clock state storing means 26. In this case, in particularly, the setting or storing of the state data item into the clock state storing means 26 is executed by receiving a setting data item corresponding to a clock edge disable state of the external receiving circuits 4a to 4n to be connected.

For example, when the clock enable edge of the clock signal of the external receiving circuits 6a to 6n connected to the synchronous serial data transfer device 5 is a rising edge enable, a data item for setting the state of the clock output terminal 12, after the completion of the final data item transfer into the level "0" of the clock edge disable state, is stored into the clock state storing means 26 in advance. This causes that the clock control means 27 can read the state data item "0". Thereby, the clock control means 27 reads the state data item "0" from the clock state storing means 26. Then, the clock control means 27, which has received the transfer completion signal, outputs the data item "0" to the clock output terminal 12. This causes the level of the clock output terminal 12 to be in the clock edge disable state of the level "0" after the completion of the final data item transfer, as shown in FIG. 8.

Similarly, when the clock enable edge of the clock signal of the external receiving circuits 6a to 6n that are connected to the synchronous serial data transfer device 5 of the second embodiment is the falling edge enable or when a clock disable edge of the clock signal of the external receiving circuits 6a to 6n is a high impedance state, the clock control means 27 reads the state data item that has been stored in the clock state storing means 26 in advance and then sets the level of the clock output terminal 12 to the level according to the read state data item, for example, the "1" level (H level) shown in FIG. 9 or the clock edge disable state, such as the high impedance state shown in FIG. 10.

Thus, according to the synchronous serial data transfer device 5 of the second embodiment, it is possible to set or keep the level of the clock output terminal 12 to the clock edge disable state of each of the external receiving circuits 6a to 6n by rewriting the state data item stored in the clock state storing means 26 with the setting data item. That is, it is possible to match or to fit the external receiving circuits 6a to 6n having different clock enable edges without any changing of the hardware configuration of the synchronous serial data transfer device 5.

Third embodiment

In the first and second embodiments of the present invention described above in detail, the synchronous serial data transfer device 3 of the first embodiment is capable of setting the level of the data output terminal 11 to the input receiving data invalid state of each of the external receiving circuits to be connected in order, and the synchronous serial data transfer device 5 of the second embodiment is capable of setting the level of the clock output terminal 12 to the clock edge disable state of each of the external receiving circuits to be connected in order. According to the present invention, it is possible to have both functions of the synchronous serial data transfer devices 3 and 5 as the first embodiment and the second embodiment.

Figure 11:
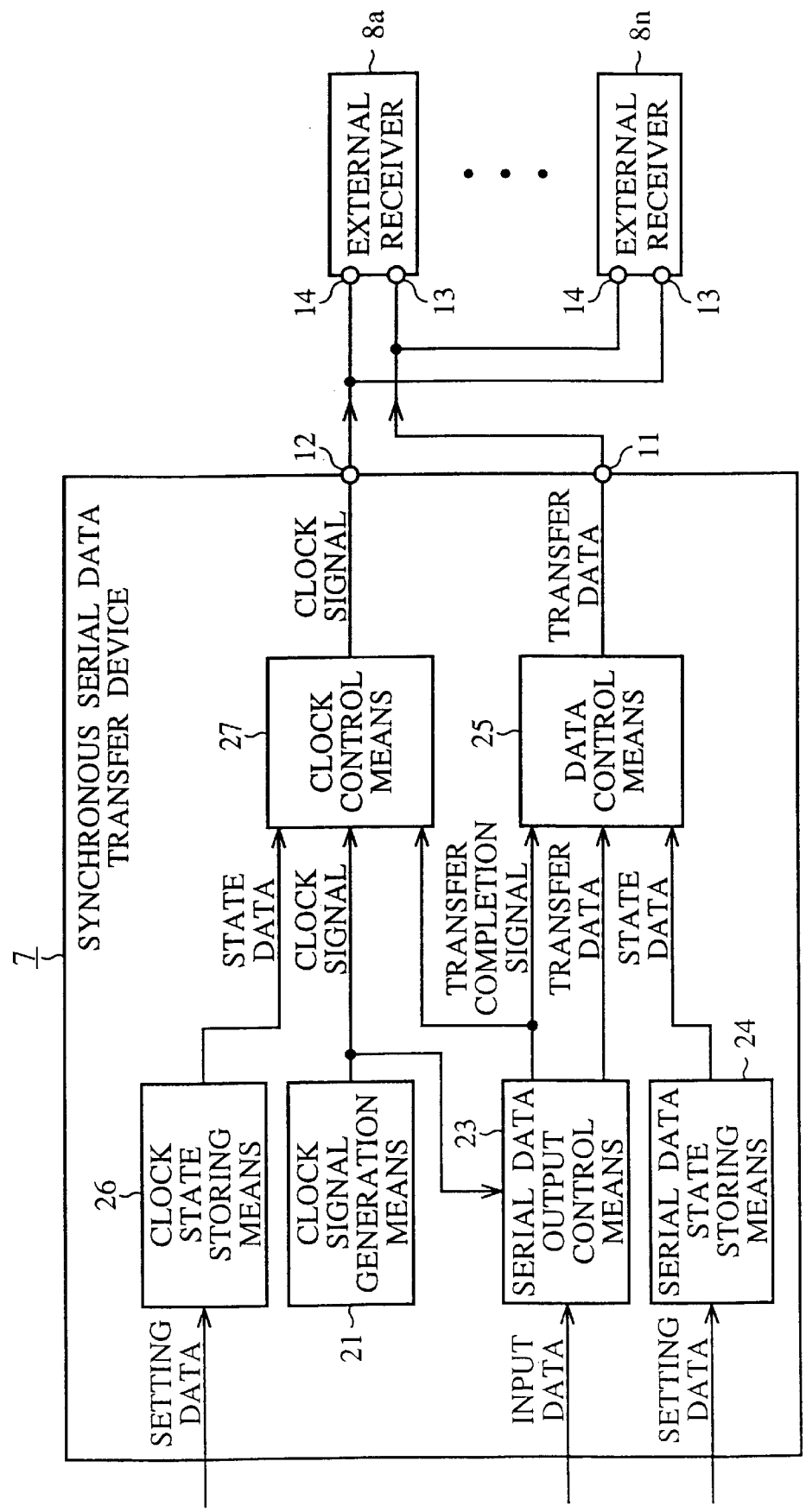
FIG. 11 is a block diagram showing the internal configuration of the synchronous serial data transfer device of the third embodiment of the present invention.
Figure 12:
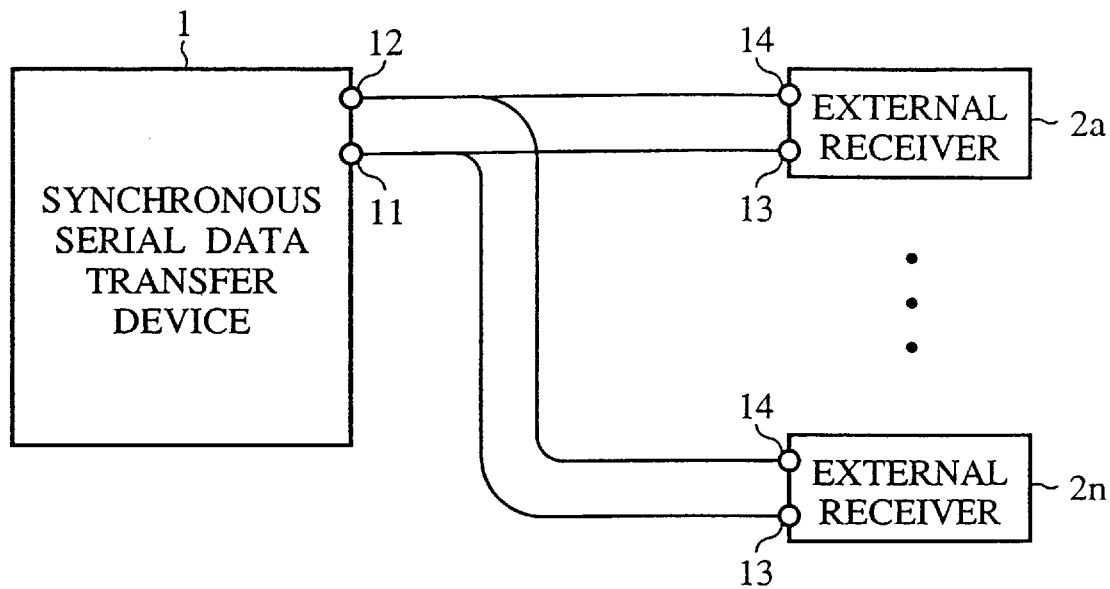
FIG. 12 is a block diagram showing a data communication system using a conventional synchronous serial data transfer device.
Figure 14:
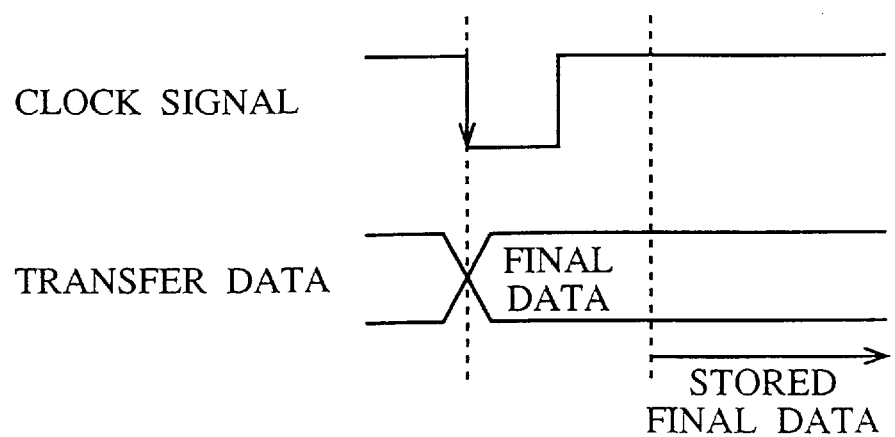
FIG. 14 is a timing chart showing waveforms of a transferred data item and a clock signal in the conventional synchronous serial data transfer device shown in FIG. 12.

FIG. 11 is a block diagram showing the internal configuration of such synchronous serial data transfer device of the third embodiment of the present invention.

In FIG. 11, the reference number 11 designates the data output terminal and 12 indicates the clock output terminal. The reference number 21 designates the clock signal generation means, 23 denotes the serial data output control means, 24 designates the serial data state storing means, 25 denotes the data control means, 26 designates the clock state storing means, and 27 denotes the clock control means. These components are same as those of the synchronous serial data transfer devices 3 and 5 as the first and second embodiments shown in FIGS. 2 and 7. Therefore the explanation of those components is omitted here for brevity.

The reference number 7 designates the synchronous serial data transfer device comprising the clock signal generation means 21, the serial data output control means 23, the serial data state storing means 24, the data control means 25, the clock state storing means 26, the clock control means 27, as the third embodiments of the present invention. The transfer data items are transferred through the data control means 25 and the clock signal is transferred through the clock control means 27 to the external receiving circuits 8a to 8n at the same time. This operation of the synchronous serial data transfer device 7 is different from the operation of the synchronous serial data transfer device 3 of the first embodiment or from the operation of the synchronous serial data transfer device 7 of the second embodiment. The reference characters 8a to 8n designate a plurality of the external receiving circuits for receiving the transfer data items provided from the synchronous serial data transfer device 7.

Next, the operation of the synchronous serial data transfer device 7 of the third embodiment will be explained.

The basic operation of the synchronous serial data transfer device 7 of the third embodiment is same as that of the synchronous serial data transfer devices 3 and 5 as the first and second embodiments. That is, when the synchronous serial data transfer device 7 of the third embodiment receives data items transferred from external devices (not shown) in parallel, the serial data output control means 23 converts the received data items to serial data items and generates transfer data items in synchronization with the clock signal generated by the clock signal generation means 21. The transfer data items are transferred to the data control means 25. The data control means 25 selects the external receiving circuits 8a to 8n and transfers the received transfer data items as transmission data items through the data output terminal 11 to the external receiving circuits 8a to 8n.

On the other hand, the clock signal generated by the clock signal generation means 21 is also transferred to the clock control means 27. The clock control means 27 transfers the clock signal to the target external receiving circuit to be transferred through the clock output terminal 12.

When the data transfer operation of the data items to the data control means 25 is completed, the serial data output means 23 generates the transfer completion signal and then transfers it to the data control means 25 and the clock control means 27. When receiving the data transfer completion signal, the data control means 25 reads the state data item stored in the serial data storing means 24 and transfers and sets the read state data item to the data output terminal 11 after the final data item transfer operation is completed. Thereby, the level of the data output terminal 11 is kept at the level corresponding to the state data item read from the serial data state storing means 24. In addition to this, when receiving the data transfer completion signal, the clock control means 27 reads the state data item stored in the clock state storing means 26. Then, the clock control means 26 sets and keeps the level of the clock output terminal 12 at the clock edge disable state corresponding to the state data item read from the clock state storing means 26.

The setting of the state data item into the serial data state storing means 24 is performed by writing a setting data item corresponding to the input receiving data invalid level of the external receiving circuit to be connected, and the setting of the state data item into the clock state storing means 26 is also performed by writing a setting data item corresponding to the clock edge disable state of the external receiving circuit to be connected, like the operations of the synchronous serial data transfer devices 3 and 5 of the first and second embodiments.

Thus, according to the synchronous serial data transfer device 7 of the third embodiment, it is possible to set or keep the data output terminal 11 to the state corresponding to the input receiving data invalid level of the external receiving device to be connected and to set or to keep the level of the clock output terminal 12 to the clock edge disable state of the external receiving circuit to be connected by rewriting the state data items stored in the serial data storing means 24 and in the clock state storing means 26 with setting data items. That is, it is be possible to match or to fit the external receiving circuits 8a to 8n having different input receiving data invalid levels and clock enable edges without any changing of the hardware configuration of the synchronous serial data transfer device 7.

As described above in detail, according to the present invention, the synchronous serial data transfer device has the configuration in which the data control means sets the level of the data output terminal to a predetermined state corresponding to the state data item read from the serial data state storing means when the serial data output control means generates the transfer completion signal and transfers it to the data control means. Thereby, it is possible to provide the synchronous serial data transfer device that is capable of matching or fitting the external receiving circuits having different input receiving data invalid levels by rewriting the state data item stored in the serial data state storing means without any changing of the hardware configuration of the synchronous serial data transfer device.

In addition, according to the present invention, the synchronous serial data transfer device has the configuration in which the state data item for setting and keeping the level of the data output terminal to the data "0" after the transfer completion signal is generated by the serial data output control means is stored into the data state storing means. Thereby, it is possible to provide the synchronous serial data transfer device that is capable of matching or fitting the external receiving circuit having the input receiving data invalid level of the data "0" by rewriting the state data item stored in the serial data state storing means without any changing of the hardware configuration of the synchronous serial data transfer device.

Furthermore, according to the present invention, the synchronous serial data transfer device has the configuration in which the state data item for setting and keeping the level of the data output terminal to the data "1" after the transfer completion signal is generated by he serial data output control means is stored into the data state storing means. Thereby, it is possible to provide the synchronous serial data transfer device that is capable of matching or fitting the external receiving circuit having the input receiving data invalid level of the data "1" by rewriting the state data item stored in the serial data state storing means without any changing of the hardware configuration of the synchronous serial data transfer device.

Moreover, according to the present invention, the synchronous serial data transfer device has the configuration in which the state data item for setting and keeping the level of the data output terminal to the high impedance state after the transfer completion signal is generated by the serial data output control means is stored into the data state storing means. Thereby, it is possible to provide the synchronous serial data transfer device that is capable of matching or fitting the external receiving circuit having the input receiving data invalid level of the high impedance state by rewriting the state data item stored in the serial data state storing means without any changing of the hardware configuration of the synchronous serial data transfer device.

Furthermore, according to the present invention, the synchronous serial data transfer device has the configuration in which the clock control means sets the level of the clock output terminal to a predetermined state corresponding to the state data item read out from the clock state storing means when the serial data output control means generates the transfer completion signal and transfers it to the clock control means. Thereby, it is possible to provide the synchronous serial data transfer device that is capable of matching or fitting the external receiving circuits having different clock enable edges by rewriting the state data item stored into the clock state storing means without any changing of the hardware configuration of the synchronous serial data transfer device.

In addition, according to the present invention, the synchronous serial data transfer device has the configuration in which the state data item, for setting and keeping the level of the clock output terminal to the "0" level after the transfer completion signal is generated by the serial data output control means and transferred to the clock control means, is stored into the clock state storing means. Thereby, it is possible to provide the synchronous serial data transfer device that is capable of matching or fitting the external receiving device, in which the clock enable edge is the rising enable edge, by rewriting the state data item stored in the clock state storing means without any changing of the hardware configuration of the synchronous serial data transfer device.

Moreover, according to the present invention, the synchronous serial data transfer device has the configuration in which the state data item, for setting and keeping the level of the clock output terminal to the "1" level after the transfer completion signal is generated by the serial data output control means and transferred to the clock control means, is stored into the clock state storing means. Thereby, it is possible to provide the synchronous serial data transfer device that is capable of matching or fitting the external receiving device, in which the clock enable edge is the falling enable edge, by rewriting the state data item stored in the clock state storing means without any changing of the hardware configuration of the synchronous serial data transfer device.

In addition, according to the present invention, the synchronous serial data transfer device has the configuration in which the state data item, for setting and keeping the level of the clock output terminal to the high impedance state after the transfer completion signal is generated by the serial data output control means and transferred to the clock control means, is stored into the clock state storing means. Thereby, it is possible to provide the synchronous serial data transfer device that is capable of matching or fitting the external receiving device, in which the clock edge disable state is the high impedance state, by rewriting the state data item stored in the clock state storing means without any changing of the hardware configuration of the synchronous serial data transfer device.

Furthermore, according to the present invention, the synchronous serial data transfer device has the configuration in which the state data items, for setting and keeping the level of the data output terminal to a predetermined state, and for setting and keeping the level of the clock output terminal to a predetermined state, after the transfer completion signal is generated by the serial data output control means and transferred to both the data control means and the clock control means, are stored into both the serial data state storing means and the clock state storing means. Thereby, it is possible to provide the synchronous serial data transfer device that is capable of matching or fitting the external receiving circuits having different input receiving data invalid levels and clock enable edges by rewriting the state data item stored in both the serial data state storing means and the clock state storing means without any changing of the hardware configuration of the synchronous serial data transfer device.

While the above provides a full and complete disclosure of the preferred embodiments of the present invention, various modifications, alternate constructions and equivalents may be employed without departing from the true spirit and scope of the invention. Therefore the above description and illustration should not be construed as limiting the scope of the invention, which is defined by the appended claims.

What is claimed is:

1. A synchronous serial data transfer device comprising:

a data output terminal for serially transferring data items to a plurality of external receiving circuits;

clock signal generation means for generating a clock signal used in data transfer;

serial data output control means for serially outputting transfer data items to the external receiving circuits through the data output terminal in synchronization with the clock signal generated by the clock signal generation means and for generating a transfer completion signal when transfer of a final data item in the transfer data items is completed;

serial data state storing means for storing a state data item to set a level of the data output terminal after the serial data output control means generates the transfer completion signal; and data control means for receiving the transfer data items serially transferred from the serial data output control means in synchronization with the clock signal, for outputting the transfer data items as transmission data to the data output terminal, and for setting the level of the data output terminal to a level corresponding to the state data item stored in the serial data state storing means when the data control means receives the transfer completion signal generated by the serial data output control means.

2. The synchronous serial data transfer device as claimed in claim 1, wherein the serial data state storing means stores the state data item for setting and keeping the level of the data output terminal at a low level after the serial data output control means generates the transfer completion signal.

3. The synchronous serial data transfer device as claimed in claim 1, wherein the serial data state storing means stores the state data item for setting and keeping the level of the data output terminal at a high level after the serial data output control means generates the transfer completion signal.

4. The synchronous serial data transfer device as claimed in claim 1, wherein the serial data state storing means stores the state data item for setting and keeping the level of the data output terminal in a high impedance state after the serial data output control means generates the transfer completion signal.

5. The synchronous serial data transfer device as claimed in claim 1, wherein the serial data state storing means comprises a state register.

6. The synchronous serial data transfer device as claimed in claim 2, wherein the serial data state storing means comprises a state register.

7. The synchronous serial data transfer device as claimed in claim 3, wherein the serial data state storing means comprises a state register.

8. The synchronous serial data transfer device as claimed in claim 4, wherein the serial data state storing means comprises a state register.

9. The synchronous serial data transfer device as claimed in claim 1, wherein the data control means comprises a selector.

10. A synchronous serial data transfer device comprising:

a data output terminal for serially transferring data items to a plurality of external receiving circuits;

clock signal generation means for generating a clock signal used in data transfer;

a clock output terminal for transferring the clock signal to the external receiving circuits;

serial data output control means for serially outputting transfer data items to the external receiving circuits through the data output terminal in synchronization with the clock signal generated by the clock signal generation means and for generating a transfer completion signal when transfer of a final data item in the transfer data items is completed;

clock state storing means for storing a state data item to set a level of the data output terminal after the serial data output control means generates the transfer completion signal; and clock control means for receiving the clock signal transferred from the clock signal generation means, and for setting the level of the clock output terminal to a level corresponding to the state data item stored in the clock state storing means when the clock control means receives the transfer completion signal generated by the serial data output control means.

11. The synchronous serial data transfer device as claimed in claim 10, wherein the clock state storing means stores the state data item for setting and keeping the level of the clock output terminal at a low level after the serial data output control means generates the transfer completion signal.

12. The synchronous serial data transfer device as claimed in claim 10, wherein the clock data state storing means stores the state data item for setting and keeping the level of the clock output terminal at a high level after the serial data output control means generates the transfer completion signal.

13. The synchronous serial data transfer device as claimed in claim 10, wherein the clock state storing means stores the state data item for setting and keeping the level of the clock output terminal at a high impedance state after the serial data output control means generates the transfer completion signal.

14. The synchronous serial data transfer device as claimed in claim 10, wherein the clock state storing means comprises a state register.

15. The synchronous serial data transfer device as claimed in claim 11, wherein the clock state storing means comprises a state register.

16. The synchronous serial data transfer device as claimed in claim 12, wherein the clock state storing means comprises a state register.

17. The synchronous serial data transfer device as claimed in claim 13, wherein the clock state storing means comprises a state register.

18. The synchronous serial data transfer device as claimed in claim 10, wherein the clock control means comprises a selector.

19. A synchronous serial data transfer device comprising:

a data output terminal for serially transferring data to a plurality of external receiving circuits;

clock signal generation means for generating a clock signal used in data transfer;

a clock output terminal for transferring the clock signal to the external receiving circuits;

serial data output control means for serially outputting transfer data items to the external receiving circuits through the data output terminal in synchronization with the clock signal generated by the clock signal generation means and for generating a transfer completion signal when transfer of a final data item in the transfer data items is completed;

serial data state storing means for storing a first state data item to set a level of the data output terminal after the serial data output control means generates the transfer completion signal;

data control means for receiving the transfer data items serially transferred from the serial data output control means in synchronization with the clock signal, for outputting the transfer data items as transmission data to the data output terminal, and for setting the level of the data output terminal to a level corresponding to the first state data item stored in the serial data state storing means when the data control means receives the transfer completion signal generated by the serial data output control means;

clock state storing means for storing a second state data item to set a level of the clock output terminal after the serial data output control means generates the transfer completion signal; and clock control means for receiving the clock signal transferred from the clock signal generation means, and for setting the level of the clock output terminal to a level corresponding to the second state data item stored in the clock state storing means when the clock control means receives the transfer completion signal generated by the serial data output control means.

* * * * *